US007266304B2

(12) United States Patent
Duraffourg et al.

(10) Patent No.: US 7,266,304 B2
(45) Date of Patent: Sep. 4, 2007

(54) SYSTEM FOR SECURE OPTICAL TRANSMISSION OF BINARY CODE

(75) Inventors: Laurent Duraffourg, Montmorot (FR); Jean-Marc Merolla, Ornans (FR); Jean-Pierre Goedgebuer, Pouilley les Vignes (FR)

(73) Assignee: France Telecom, Paris (FR)

( * ) Notice: Subject to any disclaimer, the term of this patent is extended or adjusted under 35 U.S.C. 154(b) by 562 days.

(21) Appl. No.: 10/450,289

(22) PCT Filed: Dec. 11, 2001

(86) PCT No.: PCT/FR01/03920

§ 371 (c)(1),
(2), (4) Date: Dec. 12, 2003

(87) PCT Pub. No.: WO02/49267

PCT Pub. Date: Jun. 20, 2002

(65) Prior Publication Data
US 2004/0086280 A1    May 6, 2004

(30) Foreign Application Priority Data
Dec. 12, 2000   (FR)   .................................. 00 16134

(51) Int. Cl.
*H04B 10/00*   (2006.01)
*H04K 1/00*   (2006.01)
(52) U.S. Cl. ........................ 398/151; 398/40; 398/154; 380/256
(58) Field of Classification Search ............... 398/40, 398/151, 154; 380/44, 260, 256, 278, 283
See application file for complete search history.

(56) References Cited

U.S. PATENT DOCUMENTS 6,272,224 B1 * 8/2001 Mazourenko et al. ....... 380/283

FOREIGN PATENT DOCUMENTS

EP          0877508         11/1998

OTHER PUBLICATIONS

"Technique for optical SSB generation to overcome dispersion pendities in fibre-radio systems", G.H. Smith, et al., Electronics Letter, 2nd Jan. 1997, vol. 33, No. 1.

(Continued)

*Primary Examiner*—Jason Chan
*Assistant Examiner*—Nathan Curs
(74) *Attorney, Agent, or Firm*—Cohen Pontani Lieberman & Pavane LLP

(57) ABSTRACT

An optical binary code transmission system comprising a sender comprising: means for generating a light beam; phase-shifter means; attenuator means whereby the intensity of the lateral modes is sufficiently low for there to exist at the most only one photon in the lateral modes. The phase-shifter means of the sender impose a phase-shift that is chosen randomly to be equal either to 0 or to $\pi/2$ for a first bit value or either to $\pi$ or to $3\pi/2$ for a second bit value, and the receiver comprising means for detecting the presence of a photon in the first lateral mode and means for detecting the presence of a photon in the second lateral mode, a first bit value being detected if the presence of a photon is detected in the first lateral mode and a second bit value being detected if the presence of a photon is detected in the second lateral mode.

9 Claims, 8 Drawing Sheets

OTHER PUBLICATIONS

Mérolla et al. "Quantum Cryptographic Device using Single-Photon Phase Modulation", Physical Review A, vol. 60, No. 3, pp. 1899-1905, 1999.

Mérolla et al. "Single-Photon Interference in Sidebands of Phase-Modulated Light for Quantum Cryptography", Physical Review Letters, vol. 82, No. 8, pp. 1656-1659, 1999.

Mérolla et al. "Phase-Modulation Transmission System for Quantum Cryptography", Optics Letters, vol. 24, No. 2, p. 104-106, 1999.

Mérolla et al. "Quantum transmission of Information with the Help of Subcarrier Frequency. Application to Quantum Cryptography", Optics and Spectroscopy, vol. 86, No. 2, pp. 145-147, 1999.

* cited by examiner

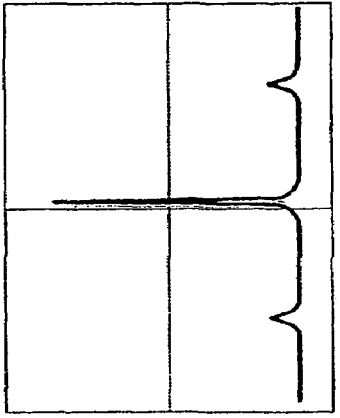
FIG.7b $|\Phi_A - \Phi_B| = \pi/2$
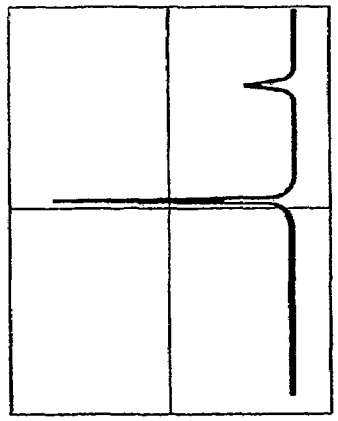
FIG.7c $|\Phi_A - \Phi_B| = 0$
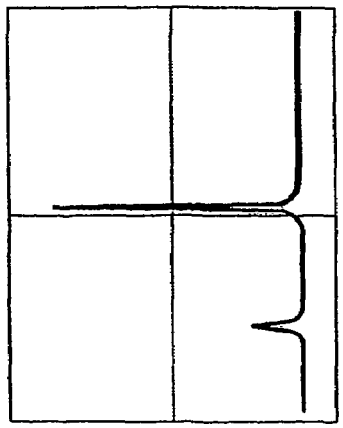
FIG.7a $|\Phi_A - \Phi_B| = \pi$

SYSTEM FOR SECURE OPTICAL TRANSMISSION OF BINARY CODE

The present patent application is a non-provisional application of International Application No. PCT/FR01/03920, filed Dec. 11, 2001.

GENERAL TECHNICAL FIELD

The present invention relates to a system for the secure optical transmission of binary code.

To be more precise, an object of the system is to improve on an existing quantum method of distributing encryption keys using modulation sidebands and the quantum properties of light. The ultimate objective is to make a transmission line secure independently of the time and of the computation power available to a spy.

In theory, a transmission line is absolutely confidential if the signal carrying information is encrypted by addition using a random encryption key employing an exclusive-OR operator. The code sent in this way is impossible to decrypt if the key, which is the same length as the message to be decrypted, is used only once. However, the encryption algorithm makes sense only if the key shared by the legitimate parties is totally secret, which is impossible to achieve using conventional methods of exchanging keys.

The laws of quantum mechanics offer the possibility of solving this problem by unconditionally secure transmission of the encryption key.

DESCRIPTION OF THE PRIOR ART

Many protocols for sharing keys have been envisaged that code each bit of a key using a quantum state of a photon.

The earliest [1] was described by Bennett et al., who propose an exchange protocol with four states forming two conjugate bases, usually referred to as a "4-state protocol" or a "BB84 protocol". A second protocol [2], also described by Bennett, and usually called a "2-state protocol" or a "B92 protocol", consists in coding the bits of the key using two non-orthogonal states. The B92 protocol is less secure than the BB84 protocol, however. This is one problem addressed by the present invention.

In both protocols, a sender (Alice) prepares a photon in a quantum state chosen randomly from the available states. A receiver (Bob) analyses each state of the incident photons by means of a quantum measurement. If a spy (Eve) attempts to eavesdrop on the secret transmission line, she must perform a quantum measurement on the state of the photons sent by Alice, thereby disturbing that state. The spy will inevitably introduce transmission errors that can be detected by consequential variations in the statistics of the photons received by Bob. Other, more complex exchange schemes based on Einstein, Podolsky, Rosen (EPR) photon transmission or on 3-state coding have also been developed.

Three techniques have been proposed for preparing the photon in the required quantum states. The first two use the BB84 protocol; the third cannot use this protocol in the current state of the art.

A first technique [3] uses the polarization state of the photon. On transmission, a "1" bit can be represented by a vertical polarization or a right-hand circular polarization and a "0" bit by a horizontal polarization or a left-hand circular polarization. On reception, Bob chooses randomly, and independently of Alice, the base for analyzing the incident photon. Detection of the photon indicates the value of the bit sent.

A second technique [4] is described in U.S. Pat. No. 5,307,410 and uses an optical time-delay to code the information. Alice and Bob use unbalanced fiber interferometers respectively to introduce and to measure the optical time-delay. Each bit is represented randomly by two values of the optical time-delay. That system thus exploits the property of single-photon interference in the time domain. Each interferometer has in one of its arms an optical phase-shifter for transmitting the key. The pulses propagate in both arms of the interferometer and do not have the same intensity: accordingly, two pulses separated by a time-delay $\Delta t$ are observed at the output of the first interferometer. One pulse is a reference pulse with a standard intensity. The other pulse is a signal pulse, on average contains fewer than one photon, and has undergone a phase-shift controlled by Alice. Three pulses are observed at the output of the second interferometer. The first is of negligible intensity, deriving from the further attenuated signal pulse. The second is the result of superposing the first signal pulse that has been time-delayed (but not attenuated) and the reference pulse that has been attenuated and phase-shifted by Bob. The intensity of the second pulse therefore depends on both of the phase-shifts as introduced by Bob and Alice, and is used to obtain an encryption key. The third and last pulse is a portion of the reference pulse that has been further delayed and whose intensity is constant. It is used to determine whether the line has been spied on.

In a third technique [6], which is the subject matter of French Patent Application No. 97 05573 and European Patent Application No. EP 0 877 508 A1, Alice codes each bit of the key on an optical frequency whose phase $\Phi_A$ is chosen randomly between two values. Bob modulates the light at the same frequency with a second phase $\Phi_B$ chosen independently of Alice. By exploiting the properties of single-photon interference in the modulation sidebands, Bob is able to determine the quantum state of the incident photons. Among other things, this transmission method can use standard electro-optical components. It is compact, which minimizes the effects of external instability. Accordingly, it can be installed on a standard network.

The foregoing techniques nevertheless have several drawbacks.

In the case of the first technique, the polarization must be rigorously maintained throughout transmission. This requires the use of polarization-maintaining fibers, which are not installed in existing networks. A second solution that can be envisaged is to control the polarization along the transmission path. This solution complicates the system enormously as it is necessary to control the fluctuation in polarization regularly, a consequence of which is to reduce the bit rate of the key.

Distribution systems based on the second technique use a pair of interferometers (transmitter/receiver interferometers) with long arms. The problem is to maintain the time-delay constant between the two arms with great accuracy and despite thermal and mechanical instabilities.

In the case of the third technique, only the 2-state B92 protocol can be used with the proposed configuration (unlike the first two techniques, which use the 4-state BB84 protocol). The 2-state protocol is less secure than the 4-state protocol. In other words, the confidentiality of the transmission is lower than can be achieved with the BB84 protocol, which in principle guarantees infinite security.

SUMMARY OF THE INVENTION

The invention proposes to alleviate this last, major drawback and to improve on the system described in the document FR 97 05573 by enabling it to use the 4-state protocol.

Thus the invention proposes an optical binary code transmission system comprising a sender, a receiver and a transmission line between said sender and said receiver, the sender comprising:
  means for generating an amplitude modulated light beam, which produces a central mode and first and second lateral modes,
  phase-shifter means for imposing a phase-shift on the modulation that is a function of the binary code to be transmitted, and
  means for attenuating the intensity of the modulated light beam so that the intensity of the lateral modes is sufficiently low for there to exist at the most only one photon per pulse in the lateral modes, and the receiver comprising:
  means for modulating the light signal synchronously with the modulation applied by the sender and with no phase-shift,
  means for imposing on said modulation a randomly chosen phase-shift equal to one or the other of the phase-shift values that can be imposed by the sender, and
  means for detecting the presence of a photon in the lateral modes after modulation of the received light signal, which system is characterized in that
  the phase-shifter means of the sender impose a phase-shift that is chosen randomly to be equal either to 0 or to $\pi/2$ for a first bit value or either to $\pi$ or to $3\pi/2$ for a second bit value, and in that
  the detector means of the receiver include means for detecting the presence of a photon in the first lateral mode and means for detecting the presence of a photon in the second lateral mode, a first bit value being detected if the presence of a photon is detected in the first lateral mode and a second bit value being detected if the presence of a photon is detected in the second lateral mode.

The invention advantageously has the following additional features, either individually or in any feasible combination:
  the sender includes:
    a light source for generating a light beam of given intensity and angular frequency ($\omega_0$),
    means for producing a first amplitude modulation electrical signal,
    means for applying a phase-shift ($\Phi_A$) to said first modulation electrical signal, and
    means for modulating the light beam by said phase-shifted first modulation electrical signal,
  and the receiver includes:
    means for producing a second modulation electrical signal,
    means for applying to said second modulation electrical signal a second phase-shift ($\Phi_B$) chosen randomly and independently of ($\Phi_A$), and
    means for modulating the received light beam by the modulated electrical signal;
    the detector means at each output include filter means and a single-photon photodetector;
    the filter means include a Fabry-Pérot spectrometer;
    the attenuator means attenuate the luminous intensity of the modulated beam so that there is on average not more than 0.1 photon per pulse in each modulation sideband;
    the system further includes means for synchronizing the two electrical modulation signals; and
    the transmitter and the receiver operate independently.

DESCRIPTION OF THE DRAWINGS

Other advantages and features emerge from the following description, which is purely illustrative, in no way limiting on the invention, and should read with reference to the accompanying drawings, in which:

FIG. 4 shows intensity spectra of light that has passed through both modulators,
FIG. 7 shows experimental power spectral densities obtained with a scanning Fabry-Pérot interferometer for different values of the relative phase-shift $\Delta\Phi$ between Alice and Bob,
  in FIG. 7(a), Alice and Bob are in phase opposition,
  in FIG. 7(b), Alice and Bob are in phase quadrature,
  in FIG. 7(c), Alice and Bob are in phase.

DESCRIPTION OF EMBODIMENTS AND USES OF THE INVENTION

Figure 1:
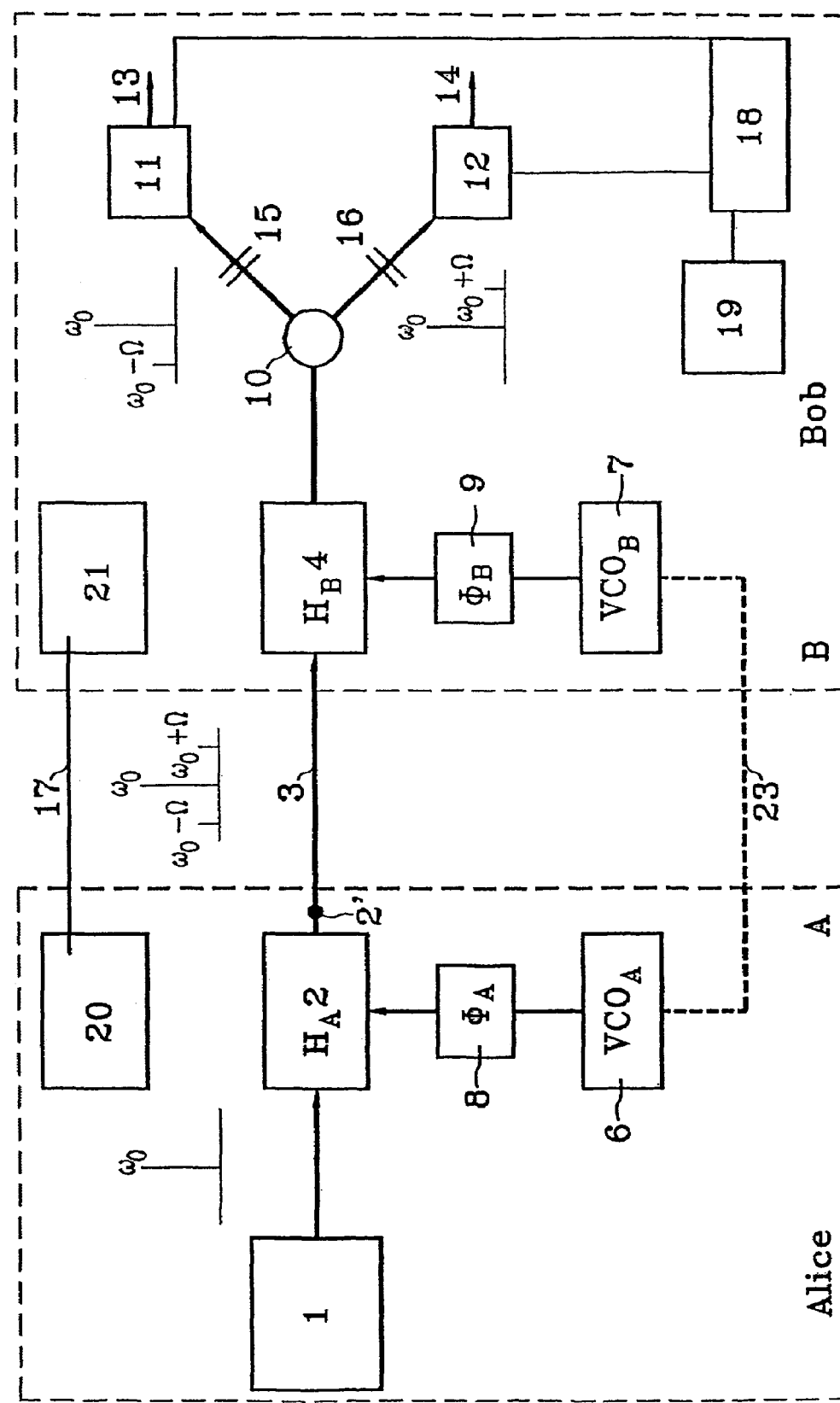
FIG. 1 is a theoretical diagram of a quantum transmission system based on generating single sidebands (SSB)

Summary of the Principle of the Distribution Protocol

The sharing of a common secret key between Alice and Bob includes three consecutive steps which guarantee that the key is absolutely secure:
(i) On transmission, Alice sends a sequence of photons, choosing randomly the quantum state in which each photon is prepared. The correspondence between each value of a bit and each quantum state is publicly known.

ii) On reception, Bob decides to measure the state of the incident photon randomly and independently of Alice.

iii) After quantum transmission, Alice and Bob disclose on a public channel the bases in which the photons were prepared without giving the value of the bits received. This exchange enables any inconclusive measurements effected by Bob to be set aside. By "inconclusive measurements" is meant those that do not indicate with certainty the state of the incident photon at Bob's receiver. In an ideal case, after the public exchange, Alice and Bob share an unprocessed and completely secret key. Under real-life transmission conditions, the encryption key contains errors due to channel noise and the possible intrusion of a spy. An error detection and correction procedure and a process for amplifying the confidentiality then complement quantum transmission as such.

The 4-state Protocol

The proposed system uses the 4-state (BB84) protocol described by Bennett et al. That protocol proceeds as follows:

On transmission, Alice chooses four quantum states $\{|u\rangle, |\bar{u}\rangle, |v\rangle, |\bar{v}\rangle\}$ that respectively represent the bits $\{1, 0, 1, 0\}$. The quantum states selected conform to the following conditions:

$$\langle \bar{u}|u\rangle = \langle \bar{v}|v\rangle = 0, \langle u|u\rangle = \langle v|v\rangle = \langle \bar{u}|\bar{u}\rangle = \langle \bar{v}|\bar{v}\rangle = 1 \quad (1)$$

$$\langle \bar{u}|v\rangle^2 = \langle \bar{v}|u\rangle^2 = \langle v|\bar{u}\rangle^2 = \langle u|v\rangle^2 = \frac{1}{2} \quad (2)$$

Equation (1) indicates that the bases $\{|u\rangle, |\bar{u}\rangle\}$ and $\{|v\rangle, |\bar{v}\rangle\}$ are orthonomic. Equation (2) indicates that the two bases are conjugate.

On reception, Bob chooses the base for a quantum measurement randomly and independently of Alice. Two situations arise:

(i) Bob uses the same measurement base that Alice used for preparation. The measurement is then deterministic and Bob knows unequivocally the value of the bit transmitted.

(ii) Bob uses the base conjugate to that Alice used for preparation. The measurement yields a random result. A "1" bit and a "0" bit are therefore equally probable. The measurement is therefore inconclusive.

When the transmission of photons has terminated, Bob discloses to Alice, over a public channel, the measurement base for each photon received. The result of the measurement naturally remains secret. By this method Alice and Bob eliminate all inconclusive results. Finally, they share a random sequence of bits that can be used as an encryption key.

If a spy, Eve, attempts to eavesdrop on the quantum transmission line, she will have to carry out the same type of measurement as Bob. She has only one chance in two of choosing the same base as Alice and obtaining a conclusive result. Also, she must return the purloined photon if she does not wish to be detected. According to the theory of quantum measurement, the photon will be in the same quantum state as the original state if Eve has used the correct base. If not, there is a 50% chance of the spy returning the photon in the wrong quantum state. Alice and Bob publicly compare a portion of the bits exchanged (constituting a bit sequence that is intentionally sacrificed) to test the quantum line. Thus Eve will be detected by the errors generated by her presence.

Description of a General System Example

FIG. 1 shows a transmission system implementing the protocol outlined above. The system includes:

A) a sender (Alice) including:
  a photon source 1, which can be a strongly attenuated laser diode and whose spectrum is centered on an optical frequency $\omega_0$.
  a frequency generator $VCO_A$ 6 that delivers an electrical signal taking the form $V'_A = m \cos \Omega t$.
  a phase-shifter 8 that shifts the phase of the signal $V'_A$ by an amount $\Phi_A$ to yield at its output a control signal $V_A = m \cos(\Omega t + \Phi_A)$ that is applied to the modulation component 2, which is a phase-shifter controlled by the bits of the key to be transmitted in accordance with the protocol:
  bit 1: $\Phi_A = 0$ or $\pi/2$,
  bit 0: $\Phi_A = \pi$ or $3\pi/2$,
  the values of $\Phi A$ being chosen randomly between 0 and $\pi/2$ for the "1" bit and between $\pi$ and $3\pi/2$ for the "0" bit.
  a modulation component 2 for which the expression for the amplitude modulation curve is $H_A$. The modulation produces in the light beam two modulation sidebands $\omega_0 \pm \Omega$.
  an attenuator that attenuates the light beam so that there is only one photon in the sidebands.

B) a receiver (Bob) including:
  a frequency generator $VCO_B$ 7 that delivers an electrical signal taking the form $V'_B = m \cos \Omega t$.
  a phase-shifter 9 that shifts the phase of the signal $V'_B$ by an amount $\Phi_B$ to yield at its output a control signal $V_B = m \cos(\Omega t + \Phi_B)$ for the modulation component 4, the phase $\Phi_B$ being chosen randomly and independently of Alice between 0 and $\pi/2$.
  a second modulation component 4 for which the expression for the amplitude modulation curve is $H_B$.
  means 10 for optically splitting the light beam from the component 4 to obtain two outputs.
  filter components 15 and 16 that optically split each of the two modulation sidebands to obtain at each output of the device a single sideband $\omega_0 \pm \Omega$.
  photodetectors 11 and 12 at the outputs 13 and 14, respectively, receiving each of the sidebands. The signals delivered by each of the photodetectors depend on the phase difference $|\Phi_A - \Phi_B|$ and are complementary to each other:
  a "1" bit is obtained when a photon is detected at the output 13,
  a "0" bit is obtained when a photon is detected at the output 14.
  means for transmitting the photons 3 via an optical fiber.
  means 23 for synchronizing the frequency generators $VCO_A$ and $VCO_B$.

Alice and Bob have means 20 and 21 for communicating with each other via a public channel 17. The receiver informs the sender via this channel which phases were used without revealing on which photodetector the photons were detected.

Theory of Operation

The intensities of the modulation sidebands created in this way after Bob vary in a complementary manner as a function of the phase-shift induced between Alice and Bob if $H_A$ and $H_B$ conform to a given necessary but sufficient condition. The expression for this condition is described in detail hereinafter. To simplify the mathematics, the following description is given by way of illustration for an example in which the modulation curves $H_A$ and $H_B$ have linear rising and falling edges. This situation, which physically corresponds to "small signals", allows the use of a development limited to the first order, and is in no way limiting on the invention. The modulation curves can also have non-linear edges.

The source 1 is a quasi-monochromatic laser diode of frequency $\omega_0$. Note that this source can be an impulse source or, in a different embodiment, a continuous source; it can be a single-frequency or quasi-monochromatic source. The amplitude of the signal is written as follows:

$$E_0(t) = |E_0|e^{j\omega_0 t} \tag{3}$$

Alice's sender 2 consists of a light modulation system whose amplitude modulation curve $H_A$ is of the following first order form:

$$H_A(V_A) \approx \frac{1}{2}(1 + K_A V_A) \tag{4}$$

In the above equation, $K_A$ is an electro-optical coefficient characterizing the component used and $V_A$ is an electrical control signal is of low amplitude and frequency $\Omega$. It is generated by the local oscillator $VCO_A$. This signal is phase-shifted by an amount $\Phi_A$ relative to the center frequency $\omega_0$: $V_A = m \cos(\Omega t + \Phi_A)$ The constant $K_A$ is generally expressed as follows:

$$K_A = K \exp j\psi_A \tag{5}$$

The optical signal $K_A(t)$ after the transmitter then consists of the center frequency $\omega_0$ and two modulation sidebands $\omega_0 \pm \Omega$ phase-shifted $\Phi_A$ relative to $\omega_0$, as indicated by equation (6):

$$E_A(t) \approx |E_0|\exp j\omega_0 t \left[1 + \frac{Km}{2}\exp j\psi_A \times \exp j(\Omega t + \Phi_A) + \frac{Km}{2}\exp j\psi_A \times \exp -j(\Omega t + \Phi_A)\right] \tag{6}$$

Figure 2:
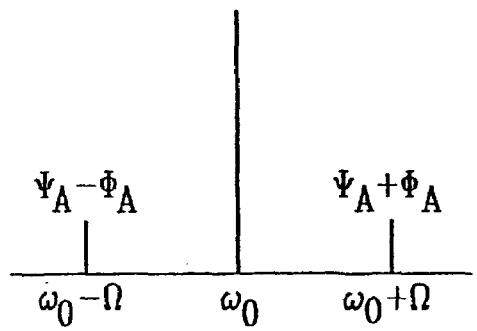
FIG. 2 shows an amplitude spectrum obtained at the output of a first modulator.

Thus at the output of the first modulator there is obtained one modulation band $\omega_0 + \Omega$ with a phase $\psi_A + \Phi_A$ and another modulation band $\omega_0 - \Omega$ with a phase $\psi_A - \Phi_A$ (FIG. 2).

Bob's receiver 3 consists of a second light modulation system. It has an amplitude modulation curve $H_B$ whose first order development is written:

$$H_B(V_B) \approx \frac{1}{2}(1 + K_B V_B) \tag{6}$$

$K_B$ is an electro-optical coefficient characterizing the component used and $V_B$ is an electrical control signal with the same amplitude and the same frequency $\Omega$, but phase shifted by $\Phi_B$: $V_B = m \cos(\Omega t + \Phi_B)$ The constant $K_B$ is generally expressed as follows:

$$K_B = K \exp j\psi_B \tag{7}$$

The second modulator operates in accordance with the same principles as the first modulator.

Figure 3:
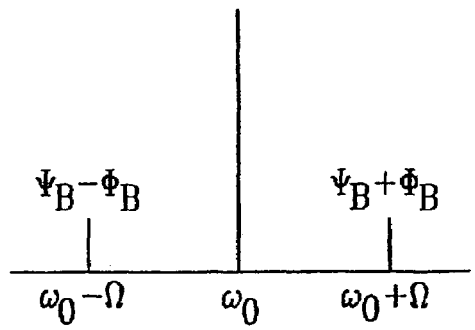
FIG. 3 shows an amplitude spectrum resulting from a second modulator applying modulation independently of the first modulator.

FIG. 3 shows the two modulation sidebands generated. The phases are $\psi_B + \Phi_B$ for the band $\omega_0 - \Omega$ and $\psi_B - \Phi_B$ for the band $\omega_0 - \Omega$.

If the two modulators operate simultaneously, the amplitude $E_B(t)$ of the signal at the output of the second modulator comprises the second frequency $\omega_0$ and the modulation sidebands. Their intensity depends on the relative phase $\Delta\Phi = |\Phi_A - \Phi_B|$:

$$E_B(t) \approx \tag{8}$$
$$\frac{|E_0|\exp j\omega_0}{4}\left[1 + \frac{Km}{2}\exp j\Omega t \times (\exp j\psi_B \exp j\Phi_B + \exp j\psi_A \exp j\Phi_A) + \frac{Km}{2}\exp -j\Omega t \times (\exp j\psi_B \exp -j\Phi_B + \exp j\psi_A \exp -j\Phi_A)\right]$$

The spectral power density at the output of Bob's analysis system therefore comprises the center frequency and two modulation sidebands $\omega_0 \pm \Omega$ with the following intensities:

$$I \approx \frac{|E_0|^2}{16} \tag{10}$$

$$i_{\omega_0+\Omega} \approx \frac{K^2 m^2 |E_0|^2}{32}(1 + \cos(\Phi_B - \Phi_A + \psi_B - \psi_A)) \tag{9}$$

$$i_{\omega_0-\Omega} \approx \frac{K^2 m^2 |E_0|^2}{32}(1 + \cos(\Phi_B - \Phi_A + \psi_B - \psi_A)) \tag{10}$$

Figure 4A:
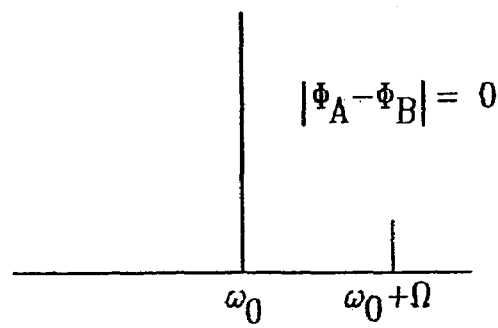
FIG. 4(a) shows the intensity spectrum for a phase-shift $|\Phi_A-\Phi_B|$ equal to 0.
Figure 4B:
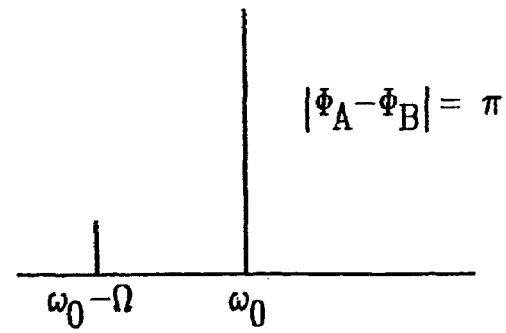
FIG. 4(b) shows the intensity spectrum for a phase-shift $|\Phi_A-\Phi_B|$ equal to $\pi$.
Figure 4C:
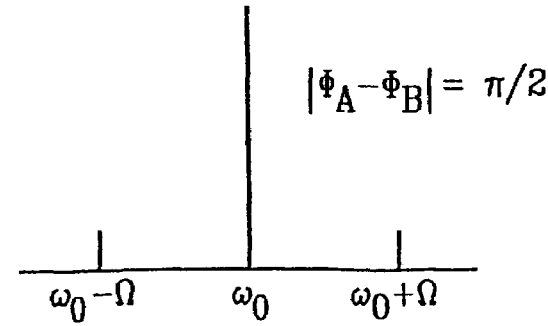
FIG. 4(c) shows the intensity spectrum for a phase-shift $|\Phi_A-\Phi_B|$ equal to $\pi/2$.

FIG. 4 shows that the intensities of the modulation sidebands depend on the relative phase difference $|\Phi_A - \Phi_B|$. The intensities $i_{\omega_0+\Omega}$ and $i_{\omega_0-\Omega}$ are complementary if the amplitude transfer curves $H_A$ and $H_B$ satisfy, for any phase difference $|\Phi_A - \Phi_B|$, the condition:

$$\psi_B - \psi_A = \frac{(2k+1)\pi}{2}, \forall k \in N \tag{13}$$

In this case, the intensities $i_{\omega_0+\Omega}$ and $i_{\omega_0-\Omega}$ are simply written:

$$i_{\omega_0+\Omega} \approx \frac{K^2 m^2 |E_0|^2}{32}\cos^2[(\Phi_B - \Phi_A)/2] \tag{11}$$

$$i_{\omega_0-\Omega} \approx \frac{K^2 m^2 |E_0|^2}{32}\sin^2[(\Phi_B - \Phi_A)/2] \tag{12}$$

If Alice and Bob are in phase, the modulation sideband $\omega_0 + \Omega$ is at a maximum and the other sideband $\omega_0 - \Omega$ is non-existent (in other words, a single sideband (SSB) $\omega 0 + \Omega$ is produced). If Alice and Bob are in phase quadrature, the two modulation sidebands are present with an intensity that is half the maximum intensity. If Alice and Bob are in phase opposition, the modulation sideband $\omega_0 - \Omega$ is at maximum and the other sideband $\omega_0 + \Omega$ is non-existent (i.e. a single sideband (SSB) $\omega_0 - \Omega$ is produced).

After Bob, a spectral filter system, for example two Fabry-Pérot interferometers, splits the two modulation sidebands and directs the band $\omega_0 + \Omega$ to the output 1 and the band $\omega_0 - \Omega$ to the output 2. There is a detector at each output.

Under quantum conditions, Alice strongly attenuates the beam behind her modulation system to obtain approximately 0.1 photon per pulse in each modulation sideband. This generates one photon every ten pulses and limits the number of pulses likely to have more than one photon. According to the quantum theory of measurement, equations (11) to (15) can then be translated in terms of the probability of detecting a photon in one of the modulation sidebands.

Transmission Procedure

Transmission proceeds as follows:

The bases used by Alice are: {0,π} and {π/2, 3π/2}. They have the properties defined by equations 1 and 2. Alice chooses a phase $\Phi_A$ and sends the photon to Bob.

Bob chooses randomly and independently of Alice the phase value $\Phi_B$ between 0 and π/2 to carry out his measurement. Accordingly to equations (14) and (15), the measurement has three possible outcomes:

ΔΦ=0: the photon is detected at output 1. This output corresponds to a "1" bit.

ΔΦ=π: the photon is detected at output 2. This output corresponds to a "0" bit.

ΔΦ=π/2: the photon is detected at output 1 or at output 2 with the same probability (indeterminate measurement).

The transmission protocol is summarized in Table 1, in which "?" indicates an indeterminate measurement.

TABLE 1

| Phase chosen by Alice | 0 | | π | | π/2 | | 3π/2 | |
|---|---|---|---|---|---|---|---|---|
| Bit sent by Alice | 1 | | 0 | | 1 | | 0 | |
| Phase chosen by Bob | 0 | π/2 | 0 | π/2 | 0 | π/2 | 0 | π/2 |
| Outputs activated | $12^{(1)}$ | ? | $(12^2)$ | ? | ? | $12^{(1)}$ | ? | $(12^2)$ |
| Public comparison | 1 | ? | 0 | ? | ? | 1 | ? | 0 |

Any pair of modulation systems whose amplitude modulation curves are defined by equations (4) and (7) and whose arguments conform to the phase relationship specified in equation (13) can be used for SSB quantum transmission of encryption keys. Thus three embodiments of a quantum transmission system using SSB generation can be described. Others can obviously be envisaged. The following examples are in no way limiting on the invention.

First Preferred Embodiment

Figure 5:
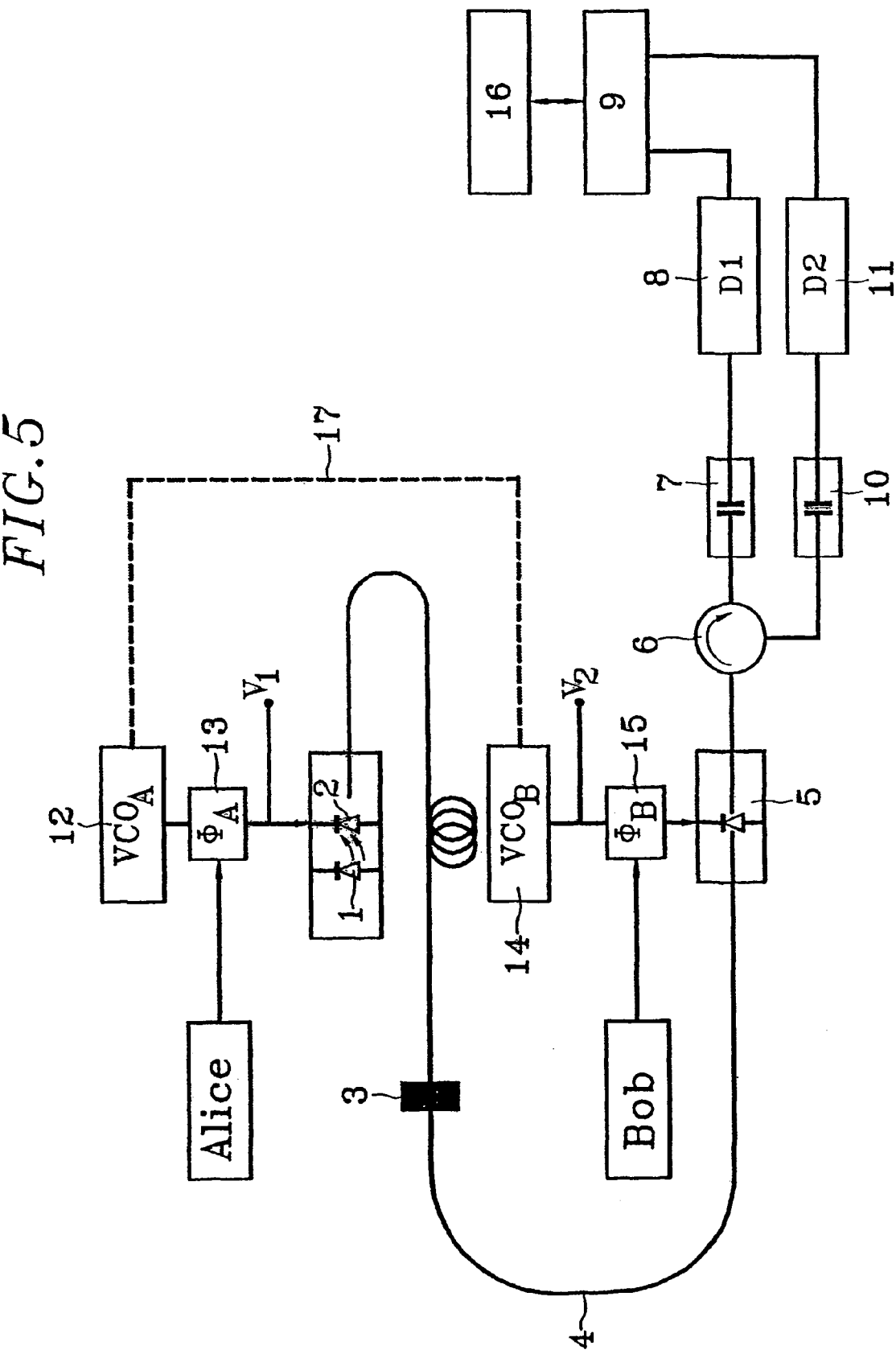
FIG. 5 shows a key transmission system constituting a first embodiment of the invention with two electro-absorbant modulators.

FIG. 5 shows a first embodiment using two electro-absorbant modulators.

The source 1 is a distributed feedback (DFB) laser diode emitting at 1550 nm, having a center frequency $\omega_0$. Its spectral width is equal to 30 MHz. Alice's sender is an electro-absorbant modulator 2 with a bandwidth of 2.5 Gbit/s controlled by a sinusoidal electrical signal with a frequency Ω of 2.5 GHz. This signal is generated by a local oscillator $VCO_A$ 12 whose phase $\Phi_A$ is fixed randomly by a phase-shifter 13 from four values (0, π) or (π/2, 3π/2). The values 0 and π/2 code a "1" bit and the values π and 3π/2 code a "0" bit.

Alice then attenuates the beam to obtain 0.1 photon per pulse on average for each modulation sideband, using a calibrated attenuator 3.

The transmission channel 4 is 30 km of 1550 nm monomode optical fiber.

Bob's modulation system is identical to that of Alice. It comprises an electro-absorbant modulator 5 controlled by a second local oscillator $VCO_B$ 14. The electrical signal is generated at the same frequency Ω but with a phase equal to $\Phi_B$ whose value can be chosen randomly and independently of Alice from 0 to π/2 by a phase-shifter 15. The operating point of each modulator is fixed by a constant voltage $V_1$ and $V_2$ to obtain the required two modulation curves.

Conventionally, the spectral density of the signal analyzed after Bob contains the center carrier frequency $\omega_0$ and a single sideband at frequency $\omega_0-\Omega$ or $\omega_0+\Omega$ when the relative phase difference $|\Phi_A-\Phi_B|$ is equal to 0 or π, respectively. The signal contains both $\omega_0-\Omega$ and $\omega_0+\Omega$ if the relative phase difference is equal to ±π/2. The two oscillators $VCO_A$ and $VCO_B$ are synchronized by means 17.

Finally, after Bob, a first Fabry-Pérot spectral filter 7 selects one of the two modulation bands, for example $\omega_0-\Omega$, which is detected by a photodetector $D_1$, output 8. The probability $P_1$ of detecting a photon in this modulation sideband follows the sin² law as a function of the relative phase difference $\Delta\Phi=|\Phi_A-\Phi_B|$ as shown by Equation (10).

A circulator 6 directs the signal reflected by the filter 7 toward a second Fabry-Pérot filter 10. This passes only the sideband $\omega_0+\Omega$, which is detected by a second photodetector $D_2$, output 11. The probability $P_2$ of detecting a photon in this modulation sideband follows the cos² law as a function of the relative phase difference $\Delta\Phi=|\Phi_A-\Phi_B|$ as shown by Equation (9). The two outputs have complementary detection probabilities, enabling use of the 4-state protocol previously explained. A counter 9 is connected to the two detectors to evaluate the number of photons emerging from Bob's system as a function of the phase difference $|\Phi_A-\Phi_B|$. Data processing means 16 process the data relating to the counting of the photons and to their time of arrival.

Second Embodiment

Figure 6:
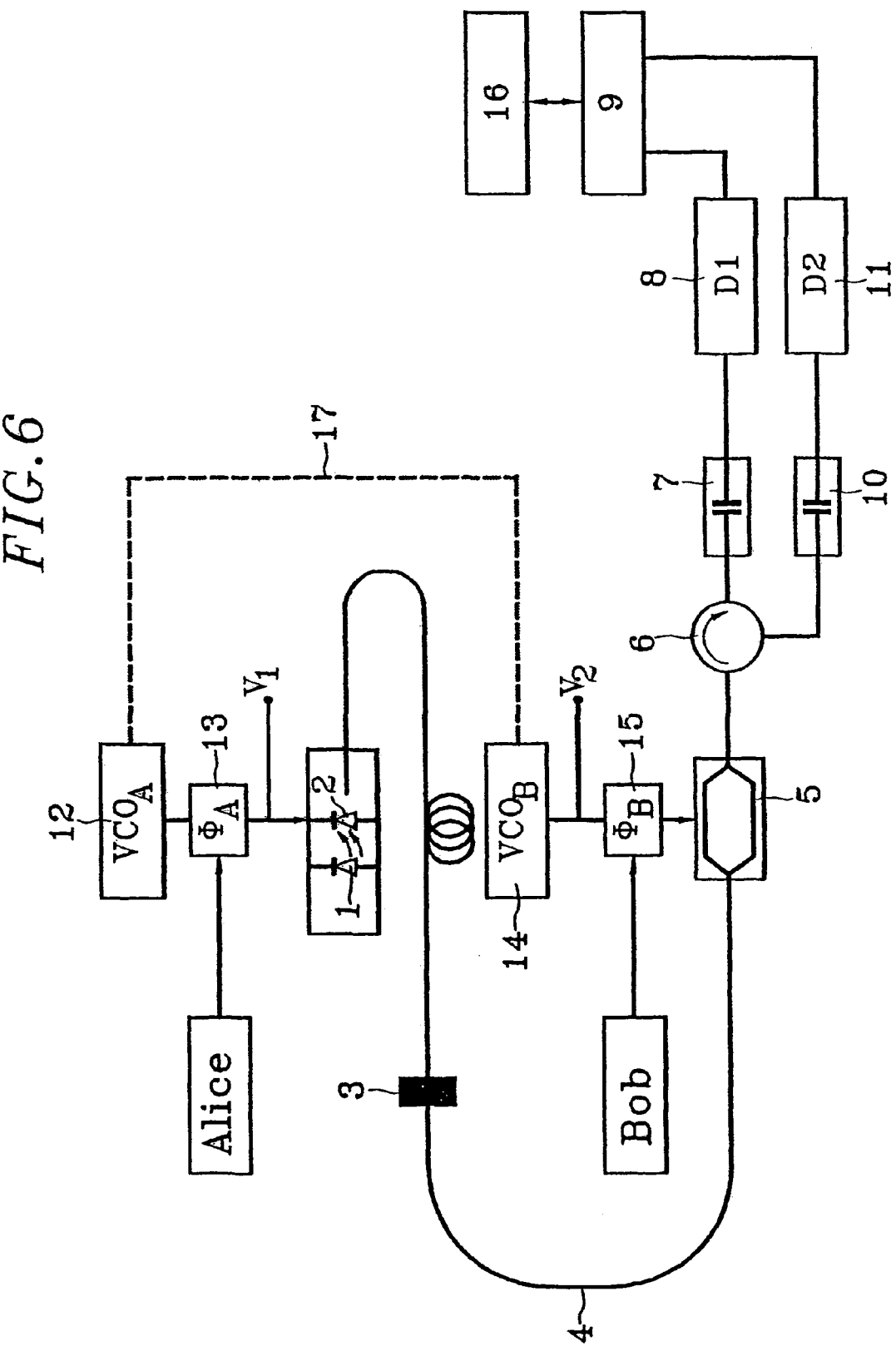
FIG. 6 is a diagram showing one embodiment of a quantum key transmission system with one electro-absorbant modulator and one Mach-Zehnder modulator.

FIG. 6 shows another embodiment of an SSB quantum encryption system with one electro-absorbant modulator and one Mach-Zehnder modulator.

The source 1 is a (DFB) laser diode emitting at 1550 nm. Its spectral width is equal to 30 MHz. Alice's modulation system is an electro-absorbant modulator 2 identical to the previous one. The transmission channel 3 is 30 km of 1550 nm monomode optical fiber.

Bob's modulation system 5 is a Mach-Zehnder modulator integrated on lithium niobate. Its half-wave voltage is equal to 5 V for a bandwidth of 5 GHz and insertion losses of 4 dB.

As previously, the operating point of the modulation systems 12 and 13 of Alice and 14 and 15 of Bob are adjusted to obtain modulation curves $H_A$ and $H_B$ defined by equations (9) and (10) using DC voltages $V_1$ and $V_2$.

The modulation sidebands are filtered using two fiber Fabry-Pérot interferometers 7 and 10 as before.

The components 8 and 11 are avalanche photodiodes at each output of Bob's modulation system. A counter 9 is connected to these two detectors to evaluate the number of photons emerging from Bob's system as a function of the phase difference $|\Phi_A-\Phi_B|$. Data processing means 16 process the data relating to the counting of the photons and to their time of arrival.

The above configuration has been tested in the conventional way, i.e. under non-quantum conditions, to find out if a spectrum comprising modulation sidebands whose intensities vary in a complementary fashion as a function of the relative phase difference is obtained after Bob. The experiment was conducted under the following conditions:

The laser diode emitted continuously at an optical power of 0 dBm. The two modulators were controlled by radio frequency (RF) electrical signals at a frequency of 2.5 GHz. The peak-to-peak amplitude of the electrical signal applied to Bob's modulator 5 was approximately 1 V, corresponding to a modulation rate m=0.3 rad. The electrical signal applied to Alice's modulator 2 was 600 mV, corresponding to a modulation rate similar to Bob's. The VCO of Alice and Bob were synchronized by means 17. The relative phase difference was applied by means of an electrically controlled phase-shifter having a bandwidth of 1 MHz. One the Fabry-Pérot interferometers was used in scanning mode as a spectrum analyzer. It had a free spectral interval of 10 GHz for a fineness of 100.

FIG. 4 shows the spectral power density of the signal at the output of Bob's system for various values of the relative phase difference $\Delta\Phi=|\Phi_A-\Phi_B|$. Each modulation sideband is effectively separated from the center frequency of 2.5 GHz.

FIG. 7 shows the experimental power spectral densities obtained with a scanning Fabry-Pérot interferometer for various values of the relative phase difference $\Delta\Phi$ between Alice and Bob. The scale on the horizontal axis is 830 MHz per division. The luminous intensity in arbitrary units is plotted on the vertical axis.

In FIG. 7(a), Alice and Bob are in phase opposition and the spectrum contains a single sideband corresponding to the frequency $\omega_0-\Omega$.

In FIG. 7(b) Alice and Bob are in phase quadrature and the spectrum contains the two sidebands corresponding to the frequencies $\omega_0\pm\Omega$. In this case, their intensity is equal to half that of the previous single sideband.

In FIG. 7(c) Alice and Bob are in phase and the spectrum contains the other single sideband corresponding to the frequency $\omega_0+\Omega$.

The system is extremely compact because Alice's modulator and the laser diode are implemented on the same substrate, or wafer, using standard devices available off the shelf. The system has two complementary outputs, enabling encryption keys to be transmitted using the 4-state protocol.

Third Embodiment

Figure 8:
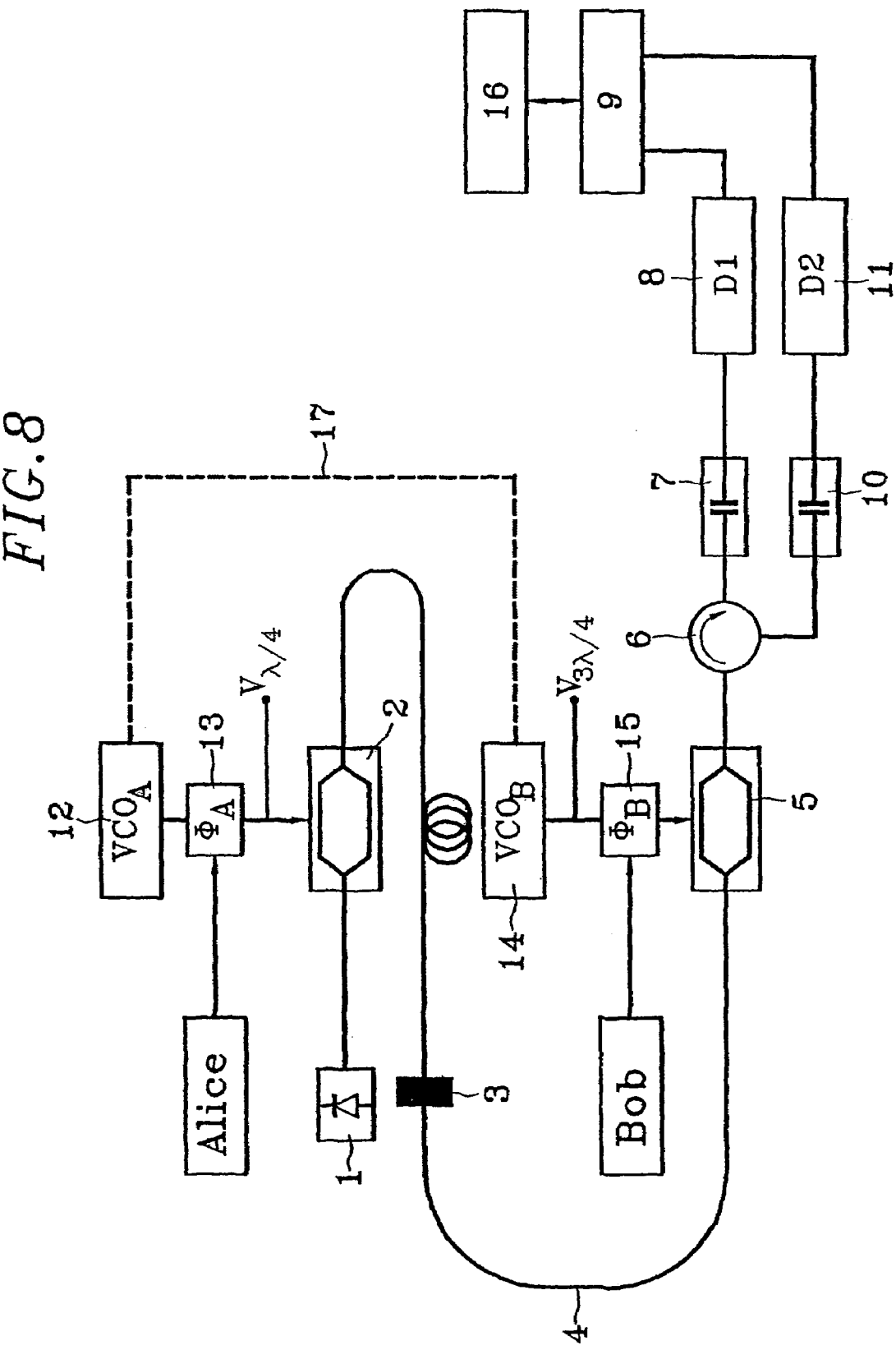
FIG. 8 shows a quantum key transmission system with two Mach-Zehnder modulators.

FIG. 8 shows a final embodiment of the SSB quantum encryption system using two Mach-Zehnder modulators.

The source 1 is a pulsed laser diode with a center frequency of $\omega_0$.

Alice's sender is an intensity modulator 2 integrated on lithium niobate with unbalanced arms. The optical path difference is set at $\lambda/4$ by a DC voltage $V_{\lambda/4}$.

The light is therefore modulated at a frequency $\Omega<<\omega_0$ with a low depth of modulation m. Alice uses a local oscillator $VCO_A$ 12 to generate the electrical modulation signal at the frequency $\Omega$ that is phase-shifted by the phase-shifter 13 by an amount $\Phi_A$ that is chosen randomly and independently of Bob from the four values (0, $\pi/2$, $-\pi/2$, $\pi$). The VCO are synchronized by means 17.

Alice then attenuates the beam to obtain 0.1 photon per pulse on average for each modulation sideband, using a calibrated attenuator 3.

The transmission channel 4 is 30 km of standard 1550 nm monomode fiber.

Bob's receiver comprises a second amplitude modulator 5 integrated on lithium niobate with unbalanced arms. The optical path difference is set at $3\lambda/4$ by a DC voltage $V_{3\lambda/4}$.

In this application, the phase relationship given in equation (13) reflects the fact that the slope of the modulation curve of the receiver is opposite to that of Alice. The modulation signal applied to Bob is generated by a second local oscillator $VCO_B$ 14 at the same frequency $\Omega$. Its phase is selected by the phase-shifter 15 and is set at $(\Phi_2+\pi/2)$. After Bob there is the same filter system comprising two fiber Fabry-Pérot interferometers 7 and 10.

Two types of experiment were carried out to verify the operation of the system.

The first was carried out with a conventional source that was not attenuated.

The second was carried out under quantum conditions, i.e. with 0.1 photon per pulse on average in each modulation sideband.

a) Experiment Under Standard Conditions:

The source 1 was a DFB laser diode emitting at 1550 nm. The diode had a spectral width of 30 MHz. The modulators 2 and 5 were electro-optical modulators integrated on lithium niobate. Their half-wave voltages were equal to 5 V, their bandwidth 5 GHz, and their insertion losses 4 dB. They were controlled by two synchronized local oscillators emitting an RF signal at 2.5 GHz. Their phases $\Phi_1$ and $\Phi_2$ could be changed by means of a phase-shifter having a bandwidth of 1 MHz. The peak-to-peak amplitude of the electrical signals applied to the modulators was 1.6 V, corresponding to a modulation rate m=0.5 rad. One of the Fabry-Pérot interferometers was set to scanning mode and used as a spectrum analyzer. Its spectral width and its free spectral interval were respectively 100 MHz and 10 GHz. The interferometers were thermostatically-controlled and polarization-independent fiber Fabry-Pérot interferometers. The laser diode emitted continuously at a power of 0 dBm. The overall losses of the transmission system were approximately −10 dB (fiber losses of −0.2 dB/km, analyzer losses of −2 dB, and losses in Bob's modulator of −4 dB).

Figure 9A:
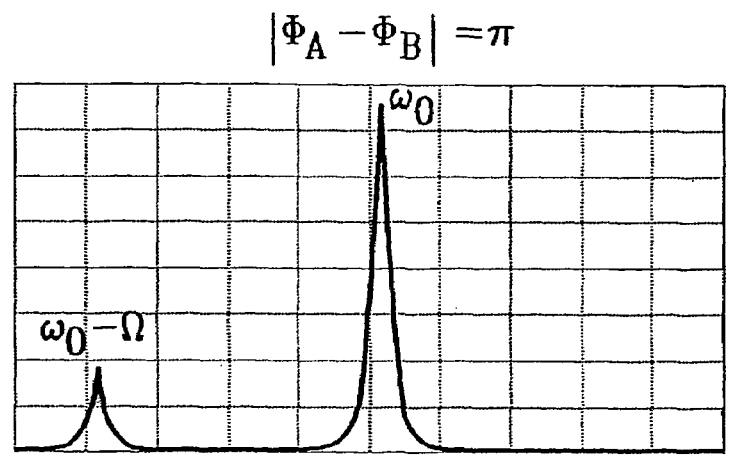
FIG. 9 shows experimental power spectral densities obtained with a scanning Fabry-Pérot interferometer for various values (0, $\pi/2$ and $\pi$) of the relative phase-shift $\Delta\Phi$ between Alice and Bob.
Figure 9B:
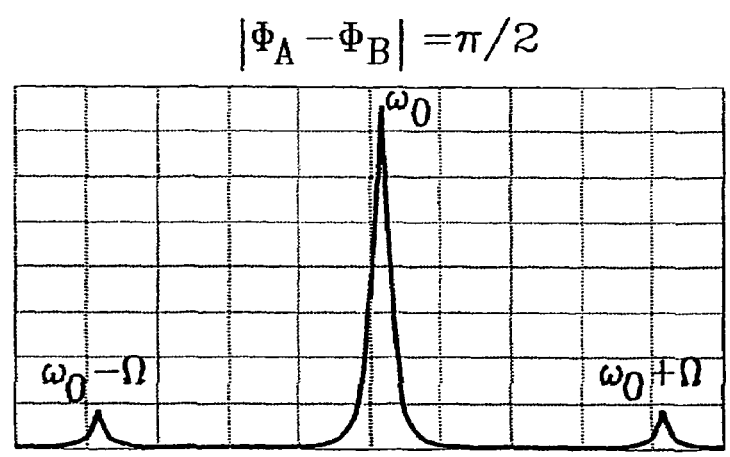
Figure 9C:
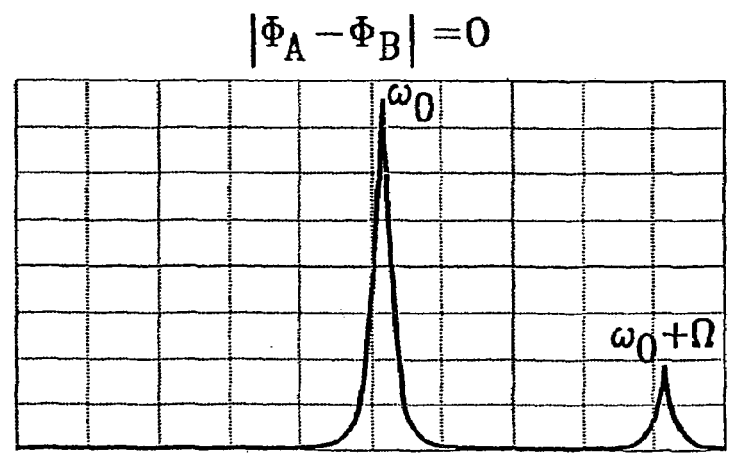

FIG. 9 shows the spectral densities displayed with the aid of the Fabry-Pérot interferometer for different values of the relative phase difference. The scale on the horizontal axis is 625 MHz per division. The luminous intensity in arbitrary units is plotted on the vertical axis.

It is clear that the modulation sidebands again vary in the required manner. The system can therefore be used to transmit an encryption key using the 4-state (BB84) protocol.

b) Experiment Under Quantum Conditions:

In this configuration, the DFB laser diode generated optical pulses 5 ns wide with a repetition rate of 1 MHz. A calibrated attenuator 3 attenuated the light at the output of Alice's coding system so that the average number of photons per pulse was approximately 0.1 in each modulation sideband. The transmission line was 22 km of 1550 nm monomode fiber. The detectors 8 and 11 were InGaAs/InP avalanche photodiodes used in active gating mode. They were cooled with the aid of a hybrid liquid nitrogen/Peltier module system to a temperature of −100° C. (±0.2° C.) to obtain a stable quantum efficiency. In this example, the quantum efficiency was evaluated at 13%. To test the performance of the system, the visibility V under quantum conditions and the quantum bit error rate (QBER) were evaluated. The procedure for determining the visibility was as follows:

The number of electrical pulses generated by the avalanche photodiodes in response to the incident photons was studied as a function of the relative phase difference $\Delta\Phi$. The value of $\Delta\Phi$ varied continuously from 0 to $2\pi$. For each value, the number of pulses was accumulated over 1 s. The dark strikes $n_d$ of the photodiodes, which correspond to spurious pulses induced by the photodiodes in the absence of light, were evaluated at 8 strikes per second (c/s).

A counter 9 was connected to the two detectors to evaluate the number of photons emerging from Bob's system as a function of the phase difference $|\Phi_A - \Phi_B|$. Data processing means 16 processed the data relating to the counting of the photons and their time of arrival.

Figure 10:
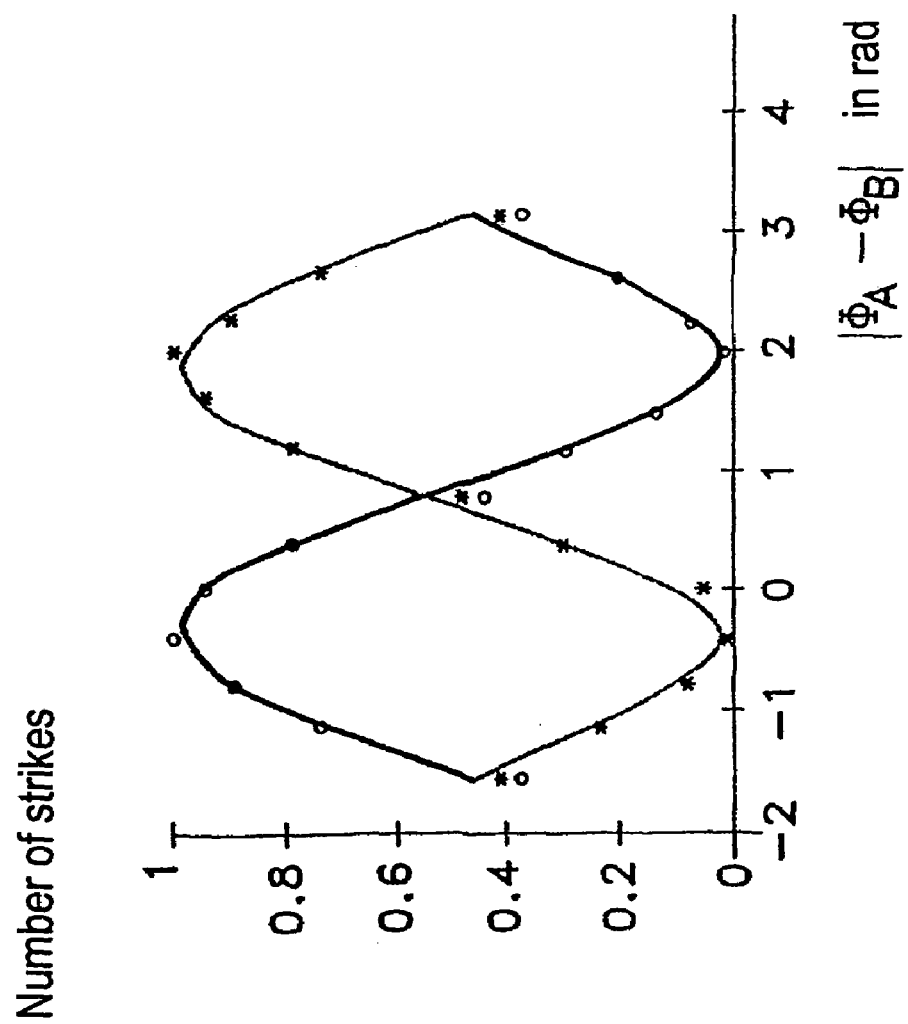
FIG. 10 shows the number of strikes induced by the presence of photons in the modulation sidebands as a function of the relative phase shift $\Delta\Phi=|\Phi_1-\Phi_2|$ when the latter varies over the range $-\pi$ to $\pi$.

FIG. 10 shows the number of strikes induced by photons present in the modulation sidebands detected at the outputs 1 and 2 as a function of the relative phase difference. The circles correspond to the experimental measurements obtained at the output 13 in FIG. 1. The continuous line curve is its $\sin^2$ approximation. The stars correspond to the experimental measurements obtained at the output 14 in FIG. 1. The dashed line curve is its $\cos^2$ approximation.

The visibility V of the single-photon interference fringes obtained in this way was of the order of 98% for the two systems of interference fringes corresponding to the two complementary outputs.

The quantum binary error rate defined in reference [4] is strongly dependent on the visibility V and the number $n_d$ of dark strikes of the photodiodes, according to the following equation:

$$QBER = 2(1-V) + \frac{n_d}{\frac{1}{2}(\mu \times \eta \times R \times T \times T_B + 2n_d)} \quad (13)$$

in which T is the attenuation caused by the fiber (−4 dB over 20 km), $T_B$ is the attenuation induced by Bob's receiver (−4 dB in this example), V is the visibility obtained experimentally, and R is the repetition rate of the optical pulses. The factor 1/2 is inherent to the BB84 protocol, since Alice and Bob have one chance in two of choosing the same base for photon preparation and analysis. Finally, from equation (11), the QBER of the system described is equal to 7.2%. That value is sufficiently low to achieve a quantum distribution of the encryption key if the limit QBER is evaluated at 30% for the BB84 protocol (its limit value for the 2-state protocol is evaluated at 10%). When that limit value is reached, the security of the key is no longer absolute.

In conclusion, SSB encryption enables quantum encryption key transmission over long distances using a 4-state protocol. The degree of security is greatly increased over the previous system using the 2-state protocol (French Patent Application No. 97/05573 and European Patent Application No. 877 508 A1). The systems described have the advantage of being compact and relatively insensitive to thermal or mechanical instability, since they can use the integrated optical technology. Furthermore, these systems can be introduced directly into standard transmission networks.

BIBLIOGRAPHY

[1] C. H. Bennett, G. Brassard, "Quantum cryptography: Public key distribution and coin tossing", *Proceeding of IEEE International on Computers, Systems and Signal Processing*, Bangalore, India, (IEEE New York, 1984), pp. 175-179.

[2] C. H. Bennett, "Quantum cryptography using any two non orthogonal states", *Physical Review Letters*, vol. 68, no. 21, pp. 3121-3124, 1992.

[3] see for example: J. Breguet, A. Muller and N. Gisin, "Quantum cryptography with polarized photons in optical fibers", *Journal of Modern Optics*, vol. 41, no. 12, pp. 2405-2412, 1994.

[4] see for example: P. D. Townsend, "Quantum cryptography on optical fiber networks", *Optical Fiber Technology*, vol. 4, pp. 345-370, 1998.

G. Ribordy, J. D. Gautier, N. Gisin, O. Guinnard and H. Zbinden, "Fast and friendly quantum key distribution", *Journal of Modern Optics*, vol. 47, no. 213. pp. 517-531, 2000.

[5] P. C. Sun, Y. Mazurenko and Y. Fainman, "Long distance frequency division interferometer for communication and quantum cryptography", *Optics Letters*, vol. 20, no. 9, pp. 1062-1064, 1995.

[6] Y. Mazurenko, J.-M. Merolla, J.-P. Goedgebuer, "Quantum transmission of information with the help of subcarrier frequency. Application to quantum cryptography", *Optics and Spectroscopy*, vol. 86, no. 2, pp. 145-147, 1999.

J.-M. Merolla, Y. Mazurenko, J.-P. Goedgebuer, L. Duraffourg, H. Porte and W. T. Rhodes, "Quantum cryptography device using single-photon phase modulation", *Physical Review A*, vol. 60, no. 3, pp. 1899-1905, 1999.

J.-M. Merolla, Y. Mazurenko, J.-P. Goedgebuer and W. T. Rhodes, "Single-photon interference of phase-modulated light for quantum cryptography", *Physical Review Letters*, vol. 82, no. 8, pp. 1656, 1999.

J.-M. Merolla, Y. Mazurenko, J.-P. Goedgebuer, H. Porte and W. T. Rhodes, "Phase-modulation transmission system for quantum cryptography", *Optics Letters*, vol. 24, no. 2, pp. 104, 1999.

[7] G. H. Smith, D. Novak and Z. Ahmed, "Technique for optical SSB generation to overcome dispersion penalties in fiber-ratio systems", *Electronics Letters*, vol. 33, no. 1, pp. 74-75, 1997.

The invention claimed is:

1. An optical transmission system for transmitting a binary code, comprising:
   a sender;
   a receiver; and
   a transmission line disposed between said sender and said receiver,
   the sender comprising:
      phase-shifter means for imposing a phase-shift on a first amplitude modulation signal, said imposed phase-shift being a function of the binary code to be transmitted;
      means for generating a light beam, amplitude modulated by the first phase-shifted amplitude modulation signal, which produces a central mode and first and second lateral modes; and
      means for attenuating an intensity of the modulated light beam so that there is at most only one photon total in the lateral modes;
   and the receiver comprising:
      phase-shifter means for imposing a phase-shift on a second modulation signal synchronized with the first amplitude modulation signal, said imposed phase-shift being randomly chosen from two values;
      means for modulating the received light signal by the second phase-shifted modulation signal;
      means for detecting a presence of a photon in the lateral modes after modulation of the received light signal;
   wherein the phase-shifter means of the sender impose a randomly chosen phase-shift to one of 0 and Π/2 for a first bit value or equal to one of Π and 3Π/2 for a second bit value of the binary code;
   wherein the phase-shifter means of the receiver impose a randomly chosen phase-shift equal to one of 0 and Π/2; and wherein the detector means of the receiver include means for detecting the presence of the photon in the first lateral mode and means for detecting the presence of the photon in the second lateral mode, the first bit value of the binary code being detected if the presence of the photon is detected in the first lateral mode and the second bit value being detected if the presence of the photon is detected in the second lateral mode.

2. The system according to claim 1, wherein the sender includes:
   means for producing the first amplitude modulation signal; and
   means for modulating the light beam by said phase-shifted first amplitude modulation electrical signal; and
wherein the receiver includes:
   means for producing the second modulation signal; and
   wherein said means for generating the light beam comprises a light source, said light beam having a predetermined intensity and a predetermined angular frequency ($\omega_0$), and said second phase shift being chosen randomly and independently of said first phase shift.

3. The system according to claim 1, wherein the detector means include filter means and a single-photon photodetector for each lateral mode.

4. The system according to claim 3, wherein the filter means include a Fabry-Pérot spectrometer.

5. The system according to claim 1, wherein the attenuator means attenuate a luminous intensity of the modulated light beam so that an average quantity of photon per pulse is at most 0.1 in each modulation sideband.

6. The system according to claim 1, further including means for synchronizing the two modulation signals.

7. A sender in an optical transmission system for securely transmitting a binary code, comprising:
   phase-shifter means for imposing a phase-shift on an amplitude modulation signal, said imposed phase-shift being a function of the binary code to be transmitted;
   means for generating a light beam, amplitude modulated by the first phase-shifted amplitude modulation signal, which produces a central mode and first and second lateral modes;
   means for attenuating an intensity of the modulated light beam so that there is at most only one photon total per pulse in the lateral modes;
   means for sending the modulated light beam over a transmission line;
   wherein the phase-shifter means impose a randomly chosen phase-shift equal to one of 0 or Π/2 for a first bit value or one of Π or 3Π/2 for a second bit value of the binary code.

8. A receiver in an optical transmission system for detecting a binary code, comprising:
   means for receiving a light signal;
   phase-shifter means for imposing on a modulation signal a phase-shift that is randomly chosen from two predetermined values;
   means for modulating the received light signal by the phase-shifted modulation signal;
   means for detecting a presence of a photon in lateral modes after modulation of the received light signal;
   wherein the phase-shifter means of the receiver impose a randomly chosen phase-shift equal to one of 0 and Π/2;
   wherein the detector means include means for detecting the presence of the photon in a first lateral mode and means for detecting the presence of a photon in a second lateral mode, a first bit value being detected if the presence of the photon is detected in the first lateral mode and a second bit value being detected if the presence of the photon is detected in the second lateral mode.

9. A method for optical transmission of a binary code between a sender and a receiver,
   wherein the sender:
      imposes a phase-shift on a first amplitude modulation signal, said imposed phase-shift being a function of the binary code to be transmitted;
      generates a light beam, amplitude modulated by the first phase-shifted amplitude modulated signal, which produces a central mode and first and second lateral modes; and
      attenuates an intensity of the modulated light beam so that there is at most only one photon total per pulse in the lateral modes; and
   the receiver:
      imposes a phase-shift on a second modulation signal. synchronized with the first amplitude modulation signal, said imposed phase-shift being randomly chosen from two predetermined values;
      modulates the received light signal by the second phase-shift modulation signal; and
      detects a presence of a photon in the lateral modes after modulation of the received light signal;
   wherein the sender imposes a randomly chosen phase-shift equal to one of 0 and Π/2 for a first bit value or equal to one of Π and 3Π/2 for a second bit value;
   wherein the receiver imposes a randomly chosen phase-shift equal to one of 0 and Π/2;
   wherein the receiver detects the presence of the photon in the first lateral mode and the presence of the photon in the second lateral mode, a first bit value being detected if the presence of the photon is detected in the first lateral mode and a second bit value being detected if the presence of the photon is detected in the second lateral mode and
   wherein the sender and the receiver compare values of a portion of exchanged bits to detect errors induced by incorrect transmission or unwanted eavesdropping by a spy on a transmission line.

* * * * *